US008532149B2

(12) United States Patent
Van Greunen et al.

(10) Patent No.: US 8,532,149 B2
(45) **Date of Patent: *Sep. 10, 2013**

(54) UPDATING ROUTING AND OUTAGE INFORMATION IN A COMMUNICATIONS NETWORK

(71) Applicant: Silver Spring Networks, Inc., Redwood City, CA (US)

(72) Inventors: Jana Van Greunen, Redwood City, CA (US); Sterling Hughes, San Mateo, CA (US); Raj Vaswani, Portola Valley, CA (US); William E. San Filippo, III, Los Altos Hills, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,835

(22) Filed: Oct. 9, 2012

(65) Prior Publication Data

US 2013/0036329 A1 Feb. 7, 2013

Related U.S. Application Data

(63) Continuation of application No. 12/411,567, filed on Mar. 26, 2009, now Pat. No. 8,311,063, which is a continuation-in-part of application No. 12/057,970, filed on Mar. 28, 2008, now Pat. No. 7,839,899.

(51) Int. Cl.
*H04J 3/06* (2006.01)
*H04L 12/56* (2011.01)

(52) U.S. Cl.
USPC .......................................... 370/503; 370/389

(58) Field of Classification Search
USPC ................................................ 370/503, 389
See application file for complete search history.

(56) References Cited

U.S. PATENT DOCUMENTS 6,192,417 B1 2/2001 Block et al.
6,331,984 B1 12/2001 Luciani (Continued)

FOREIGN PATENT DOCUMENTS

CN 1337128 A 2/2002
EP 1 912 391 A1 4/2008

(Continued)

OTHER PUBLICATIONS

Satyanarayana et al., Extensions to GMPLS RSVP Graceful Restart, internet Draft, Sep. 2005, pp. 1-41.

(Continued)

*Primary Examiner* — Mark Rinehart
*Assistant Examiner* — Angel Brockman
(74) *Attorney, Agent, or Firm* — Buchanan Ingersoll & Rooney PC

(57) ABSTRACT

After power is restored to a node in a utility network, that node employs one or more of its neighboring nodes as proxies to route a message to a central control facility of the utility. The message contains information about the restored node, and possibly one or more of its neighbor nodes. This information may include reboot counters, the amount of time that the node was down, momentary outages or power fluctuations, and/or the time of power restoration. The node that creates and initially sends the message can be the restored node itself, or another node that recognizes when a restored node has recently come back online.

20 Claims, 9 Drawing Sheets

300
301 REBOOT
302 SEND ROUTING INFORMATION UPDATE REQUEST
303 RECEIVE REBOOT INFORMATION
304 RETRIEVE REBOOT INFORMATION
305 DETERMINE WHETHER NODE HAS RECENTLY REBOOTED
NO
YES
306 UPDATE ROUTING INFORMATION
307 ADDITIONAL NODES TO COMPARE
YES
NO
308 END

(56) References Cited

U.S. PATENT DOCUMENTS

| | | | | |
|---|---|---|---|---|
| 6,704,795 | B1 | 3/2004 | Fernando et al. | |
| 6,963,285 | B2 | 11/2005 | Fischer et al. | |
| 7,215,955 | B2 | 5/2007 | Forssell | |
| 7,414,997 | B2 | 8/2008 | Lauer | |
| 7,446,665 | B1 | 11/2008 | Eslambolchi et al. | |
| 7,451,312 | B2 | 11/2008 | Medvinsky et al. | |
| 7,787,450 | B1 | 8/2010 | Chan et al. | |
| 2002/0004395 | A1 | 1/2002 | Forssell | |
| 2002/0077800 | A1 | 6/2002 | Kampe | |
| 2002/0181409 | A1 | 12/2002 | Shen | |
| 2003/0212772 | A1 | 11/2003 | Harris | |
| 2005/0152286 | A1 | 7/2005 | Betts et al. | |
| 2005/0174950 | A1* | 8/2005 | Ayyagari | 370/254 |
| 2005/0201371 | A1 | 9/2005 | Lauer | |
| 2005/0213498 | A1 | 9/2005 | Appanna et al. | |
| 2006/0029061 | A1 | 2/2006 | Pister et al. | |
| 2008/0068217 | A1 | 3/2008 | Van Wyk et al. | |
| 2008/0089348 | A1 | 4/2008 | Appanna et al. | |
| 2008/0104442 | A1 | 5/2008 | Diao et al. | |
| 2008/0123661 | A1 | 5/2008 | Steets et al. | |
| 2008/0192762 | A1 | 8/2008 | Kompella | |
| 2009/0016251 | A1 | 1/2009 | Adams et al. | |
| 2009/0116496 | A1 | 5/2009 | Savage et al. | |
| 2009/0187285 | A1* | 7/2009 | Yaney et al. | 700/292 |
| 2009/0262642 | A1 | 10/2009 | Van Greunen et al. | |

FOREIGN PATENT DOCUMENTS

| | | | |
|---|---|---|---|
| TW | 448656 | B | 8/2001 |
| TW | 1242954 | B | 11/2005 |
| TW | 201129019 | A1 | 8/2011 |

OTHER PUBLICATIONS

International Search Report and written Opinion dated Feb. 8, 2010 from corresponding International Application No. PCT/US2009/001881.

Ching-Hua Chuan et al., "Cache Management of Dynamic Source Routing for Fault Tolerance in Mobile Ad Hoc Networks", Dependable Computing, Dec. 17, 2001, pp. 199-205.

J. Moy et al., "Graceful OSPF Restart", IETF Standard, Nov. 1, 2003, pp. 1-18.

S. Sangli et al., "Graceful Restart mechanism for BGP", IETF Standard, Jan. 1, 2007, pp. 1-15.

M. Shand et al., "Restart Signaling for Intermediate System to Intermediate System", IETF Standard, Jul. 1, 2004, pp. 1-21.

E. Chen et al., "Graceful Restart Mechanism for BGP", IETF Standard, Internet Engineering Task Force, Jan. 1, 2007, pp. 1-15.

Partial International Search Report dated Jun. 18, 2009.

Invitation to Pay additional Fees with Partial International Search Report, dated May 17, 2010.

Translation of First Examination Report in counterpart Taiwan Application No. 098110099 dated Jul. 2, 2012.

Office Action mailed Dec. 14, 2009 from related U.S. Appl. No. 12/057,970.

International Search Report and Written Opinion dated Jul. 5, 2010 from corresponding International Application No. PCT/US2010/000761.

Taiwanese Office Action dated Feb. 19, 2013, in corresponding Taiwanese Patent Application No. 099108310 with English Translation.

First Office Action, dated Mar. 5, 2013, in corresponding Chinese Patent Application No. 200980116993.6 with English Translation (11 pgs.).

* cited by examiner

UPDATING ROUTING AND OUTAGE INFORMATION IN A COMMUNICATIONS NETWORK

CROSS-REFERENCE TO RELATED APPLICATIONS

This is a continuation application of U.S. patent application Ser. No. 12/411,567, filed Mar. 26, 2009, which is is a continuation-in-part of application Ser. No. 12/057,970, filed Mar. 28, 2008, now U.S. Pat. No. 7,839,899, the contents of which are incorporated herein by reference.

TECHNICAL FIELD

The disclosed subject matter generally relates to routing of packets in a communications network, and more particularly to the ability to rapidly update routing information after an interruption in communications, and send notifications pertaining thereto.

BACKGROUND

When a node first comes up on a network, it needs to obtain information that enables it to communicate with destination nodes. In the case of a fixed, wired network, that information may be pre-programmed into the node, as a result of which it is able to immediately communicate with other nodes once it is activated. In other types of networks, however, the node may need to learn about the configuration of the network before it is able to effectively communicate with other desired nodes. For example, a wireless ad hoc subnetwork may have only one, or at most a few, access points via which the nodes of the subnetwork can communicate with destinations outside of the subnetwork. Not all of the nodes in the subnetwork may have direct links to the access point, and consequently they rely upon neighboring nodes to provide a communications path to and from the access point. To facilitate efficient communications within the network, therefore, the nodes may exchange routing information that provides data relating to the quality, length, latency, etc. of various routes to the access point.

When a node is first installed in an ad hoc network, it may go through a discovery process in which it identifies its nearest neighbors, i.e., other nodes with which it has a direct communications link, and which of those nodes is able to provide a path to an access point. The node may continue to exchange information with its neighbors and update routing information, to ensure its ability to reliably communicate with an access point in an effective manner under dynamically changing network conditions. One example of a procedure via which the node establishes a path to an access point is described in U.S. Patent Application Publication No. 2007/0120705.

Another situation in which a node may need to establish, or confirm, routing information is after it has undergone a reboot operation. The reboot may be the result of a variety of different conditions, such as a software upgrade, loss of power, a regularly scheduled maintenance procedure, etc. After rebooting, the node may undergo the full network discovery process, for example of the type described above, to obtain routing information and resume communications. However, this process might require a significant amount of time. it is preferable to employ information that may already be available to the node as a result of network communications that occur prior to the reboot, to enable the node to quickly recover and resume communications after rebooting.

In one particular application, a wireless ad hoc network may be employed to provide communications between a central control facility of an electric utility, and meters that measure customers' consumption of electricity provided by the utility. When an outage occurs in the distribution infrastructure that delivers electricity to customers where consumption measuring electric meters are co-located, the communication nodes of the ad-hoc wireless network associated and co-located with the meters may also lose power, and be required to reboot when the delivery of power resumes. In some cases, the utility control facility may not be aware of the fact that power has been restored to a customer's premises, until the network node that is co-located with the electric meter at those premises rejoins the network and reports that it has resumed operation. When a large outage occurs and service personnel are in the field to restore a fault, it may be desirable for the utility to learn quickly whether power has been restored, and if so to which nodes and which part of the distribution infrastructure. This knowledge enables the utility to determine whether all faults have been fixed and restoration activities may be terminated, or whether other faults still exist and some customers still remain without power.

SUMMARY

In accordance with one aspect of the disclosed invention, routing information is updated in a node that has undergone a reboot operation by assessing the reliability of routing information available from other nodes in the network. Upon reboot of a first node, it receives reboot information from at least one other node in the network. The first node retrieves reboot information for that other node that was previously stored in a memory. The reboot information that was received from the other node is compared with that which was retrieved from the memory. If the comparison of the received and retrieved reboot information indicates that the other node has not gone through a reboot as recently as the first node, the routing information of the first node is updated with routing information downloaded from the second node.

In accordance with another aspect of the disclosed invention, after power is restored to a node in a utility network, that node employs one of its neighboring nodes as a proxy to relay a message to the central control facility of the utility. The message contains information about the restored node, and could also contain information about one or more of its neighbor nodes. This information may include reboot counters, the amount of time that the node was down, momentary outages or power fluctuations, and/or the time of power restoration.

BRIEF DESCRIPTION OF THE DRAWINGS

The foregoing aspects and many of the attendant advantages of this invention will become more readily appreciated and become better understood by reference to the following detailed description, when taken in conjunction with the accompanying drawings, wherein.

DETAILED DESCRIPTION

Figure 1:
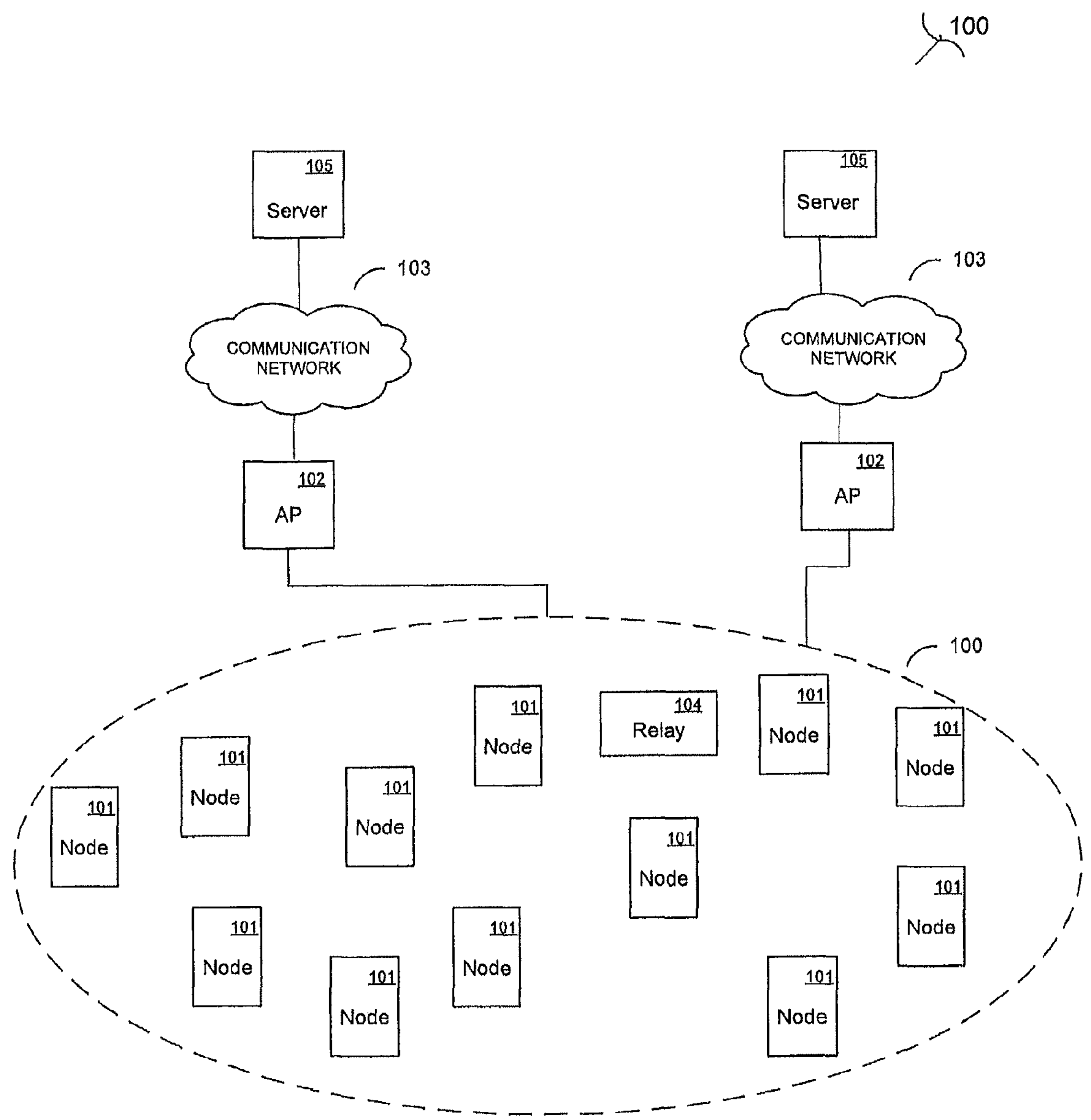
FIG. 1 is a generalized block diagram illustrating a network over which the route updating process can be implemented, according to one possible embodiment.

FIG. 1 is a generalized block diagram illustrating a communications network 100 having a plurality of nodes 101. The nodes 101 may include a processing unit, memory (for example, non-volatile memory) and a network interface. If the communications network is a wireless communication network the nodes may also include one or more radios (or wireless transceivers) to communicate with other nodes in the network. One or more nodes may also act as an access point (or gateway) 102 to another network 103. One or more electronic computing devices 105 may be connected to the communications network 103. Examples of electronic computing devices include, without limitation, servers, personal computers, handheld devices, mobile computing devices, mobile telephones, etc. One or more nodes may also be relay nodes 104 which relay packets between nodes, and/or between one or more nodes 101 and a gateway 102.

In communication networks which have access point nodes, one node may be considered "upstream" of another node in the sense that it is closer to the access point node (closer may refer to number of hops, geographic proximity, link cost, link reliability, some combination thereof, or additional factors alone or in combination with other of the listed factors). The "downstream" node may prefer and/or choose to receive routing updates from an upstream node.

During operation of the communications network 100 a node may reboot (voluntarily or involuntarily) for any number of reasons, including, without limitation, power loss, operational maintenance, automatic service disconnects, routine node refresh after firmware upgrades, or for other reasons. When the rebooting node comes back up after a reboot, it is preferable to receive routing information from other nodes, as the rebooting node may not have been able to receive routing information updates while it was "down." As other nodes in the communications network may also have gone down and have recently rebooted, the rebooting node may prefer to receive routing updates or other updates from nodes that have not recently rebooted, or have at least rebooted prior to the rebooting node and which are more likely to have more current routing information.

Figure 2:
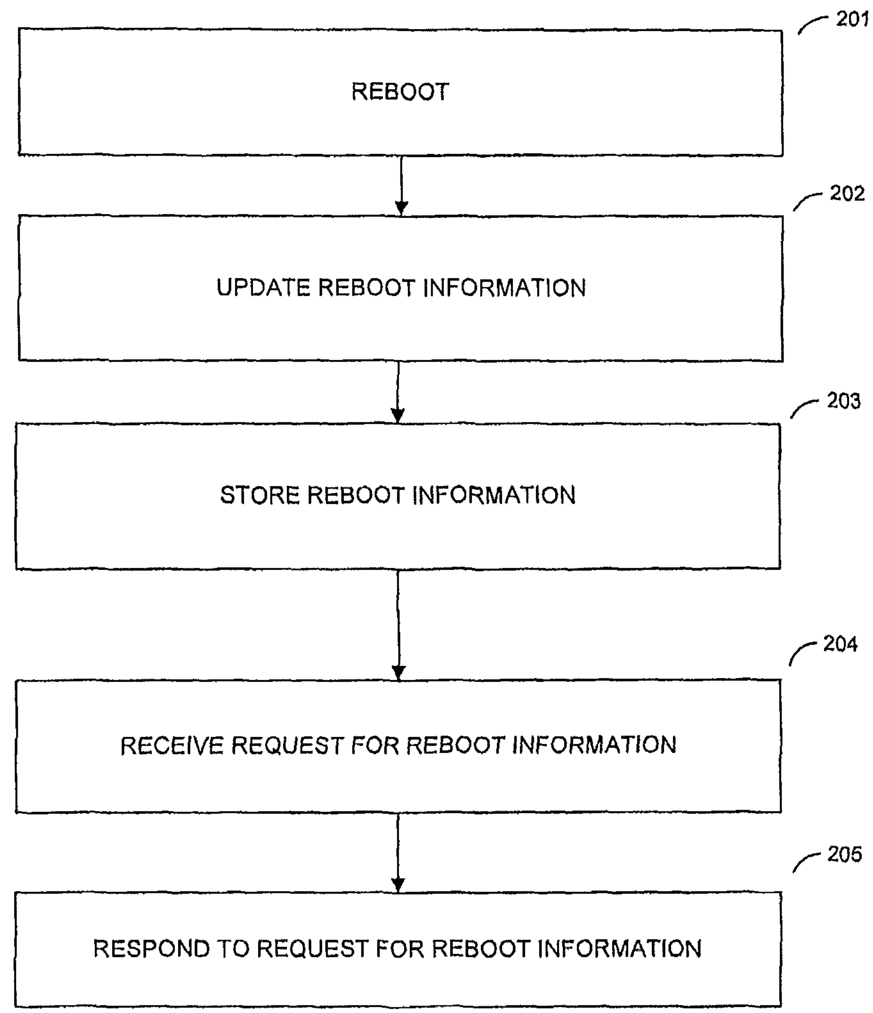
FIG. 2 is a generalized flow diagram of a process of updating reboot information and informing other nodes of reboot information, according to one possible embodiment.

FIG. 2 is a generalized flow diagram of the process of updating and providing reboot information to other nodes in the communications network. At step 201 a node reboots. In response to the reboot, at step 202 the node updates its reboot information. The node may update its reboot information during or after the reboot. If the reboot information is a reboot counter, the update may be to increment the reboot counter. The reboot counter may be incremented by one, or may be changed by some other operation on the reboot counter. If the reboot information is a reboot time stamp, the reboot time stamp will be changed to reflect the reboot. If the reboot information is a recent reboot value the recent reboot value may be set to indicate a value indicating rebooting within a predefined period of time. Other reboot information may include, without limitation, listing of latest firmware upgrades in neighbor nodes, link and path quality changes and, info success statistics among neighbor nodes. At step 203 the reboot information is stored. In one presently preferred embodiment, the reboot information is stored in non-volatile memory in the node. One example of a type of non-volatile memory is FLASH memory. Other embodiments may store the reboot information in volatile memory in the node, or volatile or non-volatile memory in a device or computer which may be accessed by the node.

At step 204 a node, such as the node that rebooted, receives a request for information from another node in the communications network. The request for information may be a specific request for reboot information, or the request may be for other information, such as a request for link or routing information. At step 205 the node responds to the request for routing information. If the request is for routing or other information, the reboot information is preferably included with the response. Additionally, the request for route information received by the node may include reboot information corresponding to other nodes in the communications network. In one alternative embodiment, reboot information is exchanged separately from routing information. In the event reboot information corresponding to other nodes is received in the request for information, the node may store the received reboot information. Preferably the storage of reboot information is in non-volatile memory of the node, such as FLASH memory. Other embodiments may store the received reboot information in volatile memory in the node, or volatile or non-volatile memory in a device or computer which may be accessed by the node.

The requesting node receives the reboot information from at least one other node. The requesting node may store the received reboot information. The reboot information may be stored in memory or a storage device associated with the node. In one preferred embodiment, reboot information is stored in non-volatile memory of the receiving node, such as FLASH memory. Other embodiments may store the received reboot information in volatile memory in the receiving node, or volatile or non-volatile memory in a device or computer which may be accessed by the receiving node.

Figure 3:
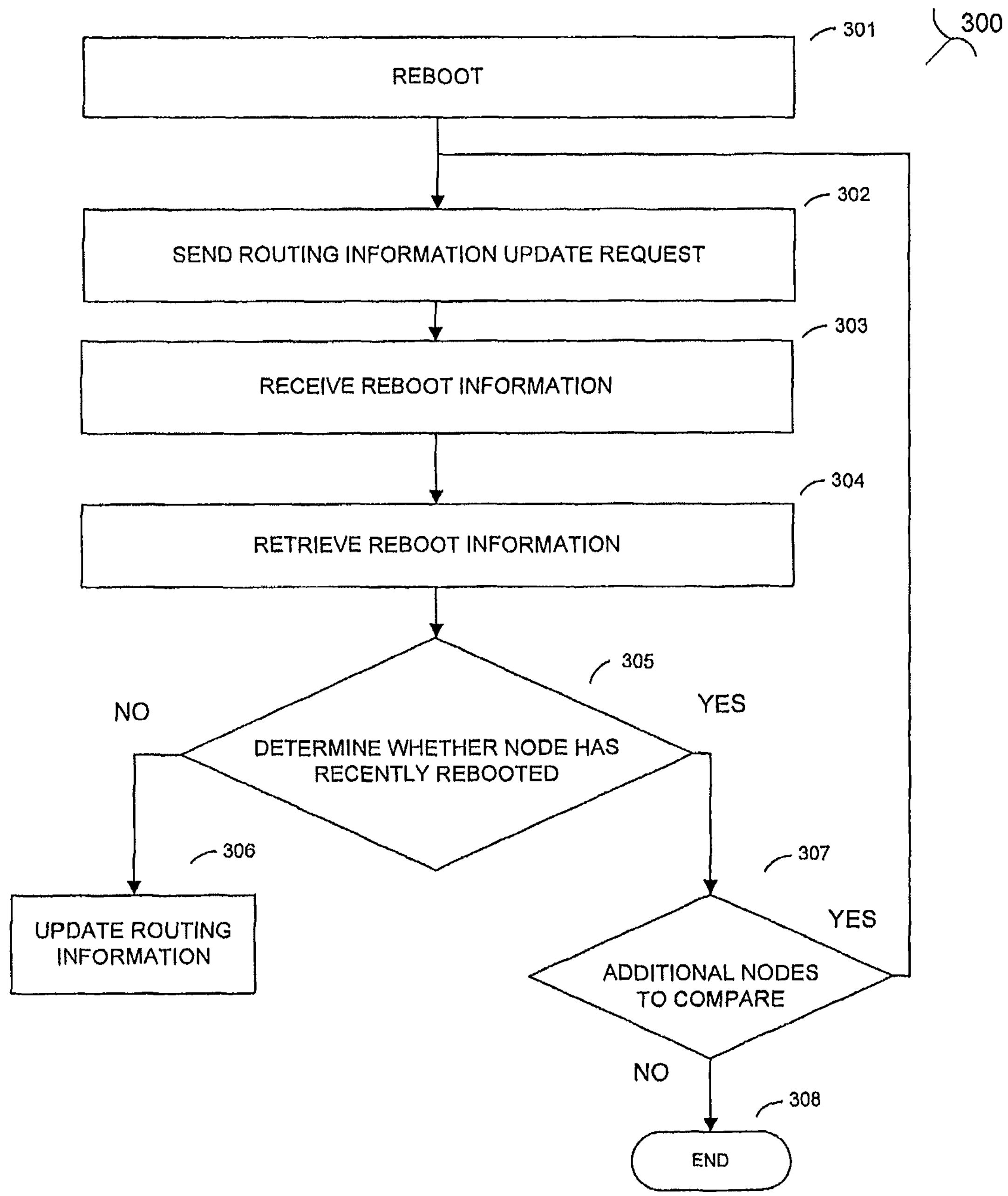
FIG. 3 is a generalized flow diagram illustrating a process of using reboot information to determine whether routing information from another node may be used to update routing information of a given node, according to one possible embodiment.

FIG. 3 is a generalized flow diagram of process 300 of using reboot information to determine whether routing information from another node is to be used for updating routing information of a given node. At step 301 a first node (or rebooting node) reboots. During, or after, reboot the first node may initiate a routing update process where, at step 302, the first node sends routing information update messages to at least one neighboring node. In one preferred embodiment, the first node sends routing update messages to nodes which it is already aware of. Those nodes that the first node is aware of may be contained in a list, which may be stored in volatile or non-volatile memory at its location or at a different location which it can securely and/or reliably access. Preferably, these nodes are neighboring nodes. Alternatively, the first node may initiate a discovery process to discover nodes, as may be done when the first node is unaware of other nodes in the communications network (as may occur due to the node first joining the network, or if the list of known nodes was lost or deleted, or when the list of known nodes is unreachable or deemed unreliable). Routing update messages may include the reboot information of the first node, and may include a request for reboot information updates. The list of discovered nodes may be used for the routing update messages sent at step 302. At step 303 the first node receives the routing update information. In one preferred embodiment, the routing update information response includes reboot information. In alternate embodiments, reboot information may be received in a separate message, which may be received in response to the routing update request, in response to a reboot information request, in response to a request for other information, or automatically without a request from the rebooting node. At step 304 the first node may retrieve reboot information it keeps on other nodes. As discussed above, reboot information may be stored in memory, or in another accessible device or storage unit, and at step 304 the first node retrieves stored reboot information on other nodes from this location. In the preferred embodiment, the retrieved reboot information may correspond to at least one node associated with the received reboot information, such that the first node has access to both the stored the reboot information and the received reboot information for at least one node.

At step 305 the first node may examine, for example by comparing, the stored reboot information and the received reboot information for at least one node to determine whether the associated node, or nodes, have recently gone through a reboot. More particularly, the first node may make a determination as to whether a given node, corresponding to the stored reboot information and the received reboot information, has routing information more current than the first node. If the given node has not rebooted since receiving the corresponding stored reboot information, or if the given node has not rebooted within a predefined time prior to the reboot of the first node, then the first node may determine to use reboot information available from the given node to update its routing information. The comparison made may vary according to the type of reboot information available. For example, if the reboot information is a reboot counter the comparison may be whether the stored reboot counter is equal to the received reboot counter. If the stored reboot counter is equal to the received reboot counter it may be determined that the given node has not rebooted since receipt of the stored reboot counter, and that the first node will update its routing information using the routing information from the given node. If at step 305 it is determined that at least one node in the comparison has routing information which is more current than the routing information of the first node, then at step 306 the first node will update the routing information using the routing information from at least one of the nodes determined to have more current routing information than the first node. If the routing information has not already been received, the first node may make a request for the routing information to be used in updating the first node.

If none of the nodes examined at step 305 are determined to have routing information more current than the first node's routing information, then at step 307 the first node may determine whether there are additional nodes which may be compared. If no additional nodes may be compared, the process may end at step 308. If at step 307 the first node determines that there are additional nodes to be compared, it may return to step 302 to obtain additional information from other nodes, and follow the process of comparison from step 302. As the first node may have compared all of the nodes that it keeps reboot information on, the first node may proceed to step 302 to request stored reboot information for other nodes as well as request reboot information from nodes corresponding to the requested stored reboot information. Alternatively, if at step 307 the first node determines that there are additional nodes to be examined for a recent reboot and the first node has the information needed for examination, then the first node may return to steps 304, 305, or any other step as appropriate.

The first node may, at step 305, compare the stored and received reboot information of other nodes known to the first node until it is able to find a node having routing information more current than the first node's routing information. This may include sending out other reboot information requests for reboot information of other nodes. If a node is found which has not recently rebooted, then the first node proceeds to step 306 to update its routing information.

The above processes may be combined, in whole or in part, with our without modification, in various embodiments. For illustration purposes, multiple exemplary embodiments are provided below.

While the above embodiments concerned updating routing information, alternate embodiments may update other information in addition to routing information, or may update other information without updating routing information.

EXAMPLE 1

A wireless FHSS (Frequency Hopping Spread Spectrum) communication network of 5000 nodes, with multiple subnetworks, uses IP based protocols (for example, IPv4 or IPv6) to provide communication to 5000 utility meters. The utility meters measure consumption of a commodity provided by a utility (in the present example, the metered commodity is electricity, but other embodiments could also measure water, gas, or other commodities, alone or in combination). The utility nodes (which may include the meter or couple to the meter to allow reading and/or control of the meter) include routing information to allow the nodes to communicate with one or more back office systems through multiple access point nodes. Most of the utility nodes in the utility network are unable to communicate directly with an access point node. Accordingly, packets sent to and from a given node as part of communication with the back office system typically are initially sent to another utility node, which relays the packets between the given node and one or more access point nodes.

The utility nodes maintain and exchange reboot counters. The reboot counters are integer values representing the number of reboots a utility node has gone through. Reboot counters for utility nodes in the communications network are stored in flash memory of the utility nodes. For example, if a given utility node, designated UN-471, has rebooted three times it may maintain a reboot counter RebootCounter=3. Upon rebooting, utility node UN-471 will increment its reboot counter by 1, such that RebootCounter=4. Utility node UN-471 will share its reboot counter with its neighbor nodes (in this example, the nodes it is aware of and which it keeps information to communicate with). Sharing is done soon after incrementing the reboot counter, and may also be done regularly (for example, when updating link and other information, or when exchanging packets).

When utility node UN-471 performs a reboot, it initially establishes contact with one or more neighboring nodes, based upon stored neighbor information. After establishing contact with one or more neighboring nodes, utility node UN-471 makes a request of at least one neighboring node to provide its reboot counter. If utility node UN-464 is the neighbor node in communication with utility node UN-471, and utility node UN-471 has requested utility node UN-464's reboot counter, utility node UN-464 may respond by giving its reboot counter, which is RebootCounterreceived=6. Utility node UN-471 retrieves the stored reboot counter for UN-464, which is RebotCounterstored=5. Utility node UN-471 compares the stored reboot counter for UN-464 to the received reboot counter, and based on the stored reboot counter not being equal to the received reboot counter, concludes that UN-464 has gone through a reboot since the last updating of the reboot counter for UN-464. Accordingly, it is determined that the routing information of UN-464 is not to be used for updating UN-471's routing information. UN-471 then seeks to find a node which has not incremented its reboot counter beyond the value of its stored reboot counter. UN-471 may compare the reboot counters of other nodes it has received and for which it has a corresponding stored reboot counter. It may also request reboot counters from other utility nodes. Utility node UN-471 receives reboot counters for five other nodes, UN-469, UN-472, UN-473, UN-478 and UN-485, for which UN-471 also has stored reboot counters. From comparing the stored and received reboot counters, UN-471 determines that UN-485 and UN-473 have not incremented their reboot counters (both the stored and received reboot counters for UN-485 are equal to 2, while both the stored and incremented reboot counters for UN-473 are equal to 11). As UN-485 is upstream of UN-471 (that is, both UN-471 and UN-485 are on the same subnet, UN-485 is fewer hops to the access point of the subnet, and packets from UN-471 to and from UN-485 may efficiently pass through UN-485 according to various routes), UN-471 uses information from UN-485 to update UN-471's routing information. Accordingly, UN-471 requests routing update information from UN-485, and uses the received route update information to update UN-471's routing information.

EXAMPLE 2

A wireless mesh network of sensors (a wireless sensor network) has 800 sensor nodes. The mesh network has three distinct subnets, and some sensor nodes are on more than one subnet. Sensor nodes maintain a reboot timestamp, which indicates the last time the node has rebooted. One of the sensor nodes in the wireless mesh network, designated SN-206, last rebooted on Aug. 23, 2007 at 4:13 am, so its reboot time stamp RBTS=0823070413. SN-206 shares its time stamp with other nodes when other nodes request link or routing information from SN-206. SN-206 is on two subnets of the wireless mesh network, which are designated SUB-1 and SUB-2. SN-206 has ten neighbor nodes on SUB-1 for which it maintains link information, and also stores a reboot time stamp for all ten of these neighbor nodes. At 3:44 pm on Sep. 17, 2007, SN-206 rebooted. During the reboot process, SN-206 updated its reboot time stamp, which is now RBTS=0917071544. After reboot, SN-206 establishes contact with its neighbor sensor nodes, and requests time stamp information from all of its neighbor nodes. In this example embodiment, SN-206 waits until after its directly connected neighborhood stabilizes before it requests reboot information. Of the ten neighbor nodes on SUB-1, eight are able to respond. SN-206 compares the received time stamps to the stored time stamps for the eight nodes that responded. Of the eight neighbor nodes to SN-206 on SUB-1, only two have rebooted since the time SN-206 received the time stamps stored in SN-206's memory. SN-206 chooses one of the six neighbor nodes which it has determined have not recently rebooted to request routing update information. In this example embodiment, SN-206 chooses the neighbor with the lowest link cost which is "upstream" of SN-206 in subnet SUB-1, requests routing information from that node and uses the routing information it receives to update SN-206's routing information for sub-network SUB-1. Similarly, SN-206 also establishes contact with its neighbor nodes on subnet SUB-2. SN-206 has five neighbor nodes on SUB-2, and SN-206 requests reboot timestamp information from all five neighbors. All five respond by providing SN-206 with their current reboot timestamp. By comparing the stored and received reboot timestamps SN-206 determines that none of the responding neighbor nodes has rebooted recently. Accordingly, SN-206 chooses the neighbor with the lowest link cost which is "upstream" of SN-206 in subnet SUB-2, requests routing information from that node and uses the routing information it receives to update SN-206's routing information for SUB-2.

EXAMPLE 3

A wireless mesh network of 1,200 communication nodes arranged in a single network with no subnets. The communications nodes are arranged in a pre-defined geographical area. There are two access point nodes and multiple relay nodes in the wireless mesh communications network. Communications nodes keep track of reboots using reboot information, which is a recent reboot value indicating whether the communications node has rebooted within a preset period of time. Communications node CN-783 has not rebooted in more than one hour, so its recent reboot value is set to zero ($RR_{CN\text{-}783}=0$). At 9:21 am on Sep. 19, 2007 CN-783 rebooted. During reboot, CN-783 set the recent reboot value to one ($RR_{CN\text{-}783}=1$) to indicate that it has recently gone through a reboot process. CN-783 requests reboot information from its direct access neighbors. CN-783 has seven direct access neighbors, five of which return a recent reboot value of one, indicating a reboot within the last hour. Two direct access nodes, CN-773 and CN-779 return a recent reboot value of zero, indicating that they have not rebooted within the last hour. Based on the returned recent reboot value, CN-783 chooses a direct access node which has not recently rebooted to receive routing updates. Based upon link cost factors, CN-783 chooses to request and receive routing information from CN-779 to update its routing information. One hour after reboot, if it has not gone through another reboot, CN-783 changes its recent reboot value back to zero, to indicate it has not rebooted within the predetermined "recent" timeframe. Similarly, other communication nodes in the wireless mesh network update their recent reboot counters as configured.

Figure 4:
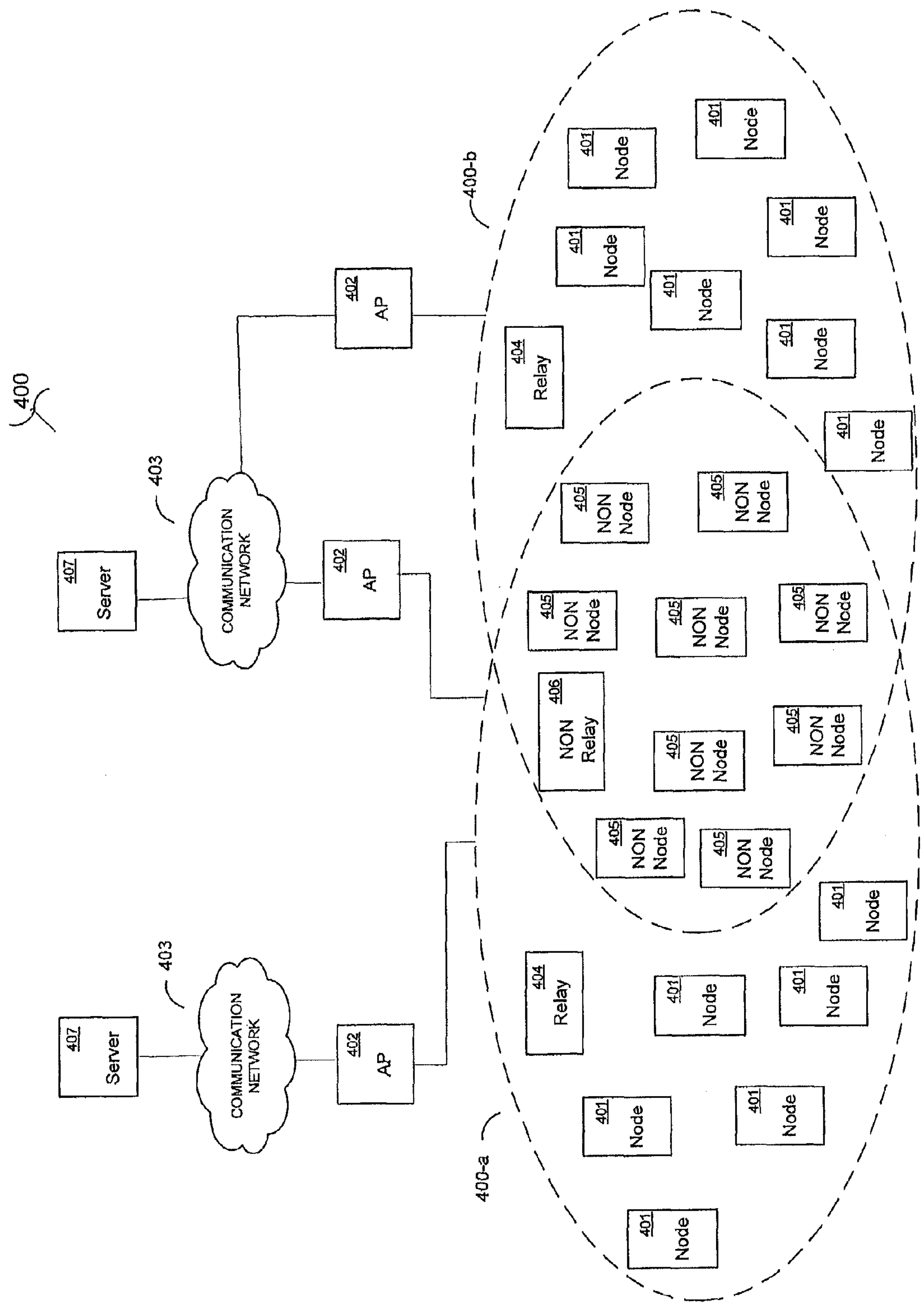
FIG. 4 is a generalized block diagram illustrating a communications network having a plurality of nodes, according to one possible embodiment.

FIG. 4 is a generalized block diagram illustrating a communications network 400 having a plurality of nodes 401. The nodes 401 are arranged into two sub networks 400-*a* and 400-*b*. Nodes which are members of two or more networks may be referred to as network overlap nodes (NONs) 405, or may be referred to as nodes participating in multiple networks. One example of a network overlap node is a node which is a member of multiple subnets within a given network. Subnets may be organized according to many possible criteria including, without limitation, geographic area. As discussed in examples below where subnets are geographically arranged, network overlap nodes may be able to communicate on more than one of the subnets, as such network overlap nodes exist in an area where two or more subnets overlap. One or more nodes may also act as an access point (or gateway) 402 to another network 403. One or more electronic computing devices 407 may be connected to the communications network 403. Examples of electronic computing devices include, without limitation, servers, personal computers, handheld devices, mobile computing devices, mobile telephones, etc. One or more nodes may also be relay nodes 404 which relay packets between nodes, and/or between one or more nodes 401 and the gateway 402. A relay node may also be part of two more subnets, and may be referred to as a network overlap relay node (NON relay) 406.

As above, in communication networks which have access point nodes, one node may be considered "upstream" of another node in the sense that it is closer to the access point node (closer may refer to number of hops, geographic proximity, link cost, link reliability, some combination thereof, or additional factors). The "downstream" node may prefer and/or choose to receive routing updates from an upstream node.

During operation of the communications network 400, a node or network overlap node may reboot (voluntarily or involuntarily) for any number of reasons, including, without limitation, power loss, operational maintenance, automatic service disconnects, routine node refresh after firmware upgrades, or for other reasons. When the rebooting node comes back up after a reboot, it is preferable to receive routing information from other nodes, as the rebooting node may not have been able to receive routing information updates while it was "down." As other nodes in the communications network may also have gone down and have recently rebooted, the rebooting node may prefer to receive routing updates or other updates from nodes that have not recently rebooted, or have at least rebooted prior to the rebooting node and which are more likely to have more current routing information. Additionally, a rebooting node may prefer to receive routing update information from a network overlap node, as such nodes may have more up-to-date routing or other information, or the network overlap node may provide access to a given node or network through another network on which the network access node is able to communicate.

Figure 5:
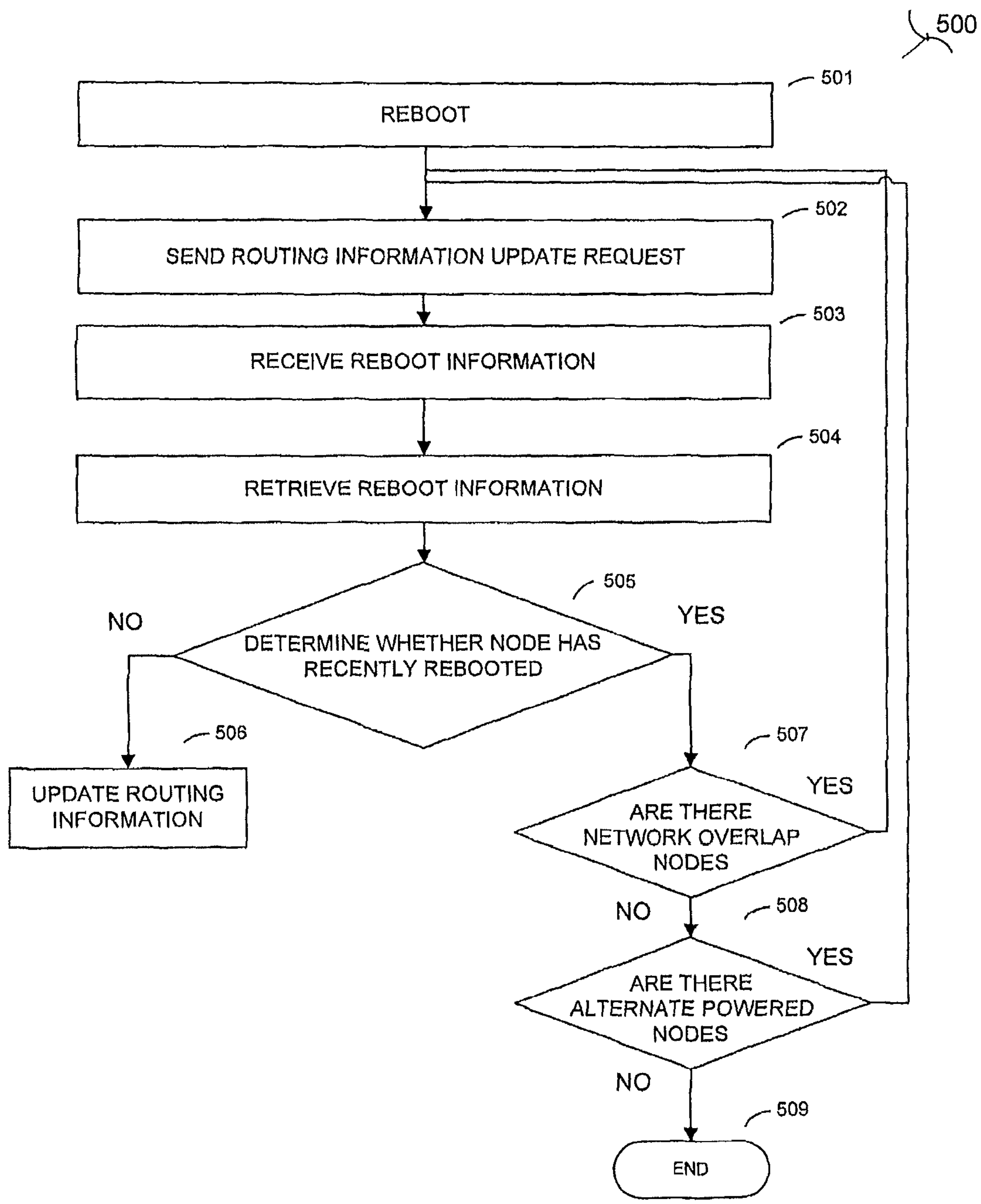
FIG. 5 is a generalized flow diagram illustrating a process of discovering nodes for information updates by a rebooting node, according to one possible embodiment.

FIG. 5 is a generalized flow diagram illustrating a process 500 of discovering nodes for information updates by a rebooting node. At step 501 a first node (or rebooting node) reboots. During, or after, reboot the first node may initiate a routing update process where, at step 502, the first node sends routing information update messages to at least one neighboring node. In one preferred embodiment, the first node sends routing update messages to nodes of which it is already aware. The nodes that the first node is aware of may be contained in a list, which may be stored in volatile or non-volatile memory at its location or at a different location which it can securely and reliably access. Preferably, these nodes are neighboring nodes. Alternatively, the first node may initiate a discovery process to discover nodes, as may be done when the first node is unaware of other nodes in the communications network (as may occur due to the node first joining the network, or if the list of known nodes was lost or deleted, or when the list of known nodes is unreachable or deemed unreliable). Routing updates may include the reboot information of the first node, and may include a request for reboot information updates. The list of discovered nodes may be used for the routing update messages sent at step 502. At step 503 the first node receives the routing update information. In one preferred embodiment, the routing update information response includes reboot information. In alternate embodiments, reboot information may be received in a separate message, which may be received in response to the routing update request, in response to a reboot information request, in response to a request for other information, or automatically without a request from the rebooting node. At step 504 the first node may retrieve reboot information it keeps on other nodes. As discussed above, reboot information may be stored in memory, or in another accessible device or storage unit, and at step 504 the first node retrieves stored reboot information on other nodes from this location. In the preferred embodiment, the retrieved reboot information may correspond to at least one node associated with the received reboot information, such that the first node has access to both the stored the reboot information and the received reboot information for at least one node.

At step 505 the first node may examine, for example by comparing, the stored reboot information and the received reboot information for at least one node to determine whether the associated node, or nodes, has recently gone through a reboot. More particularly, the first node may make a determination as to whether a given node, corresponding to the stored reboot information and the received reboot information, has routing information more current than the first node. If the given node has not rebooted since receiving the corresponding stored reboot information, or if the given node has not rebooted within a predefined time prior to the reboot of the first node, then the first node may determine to use reboot information available from the given node to update its routing information. The comparison that is made may vary according to the type of reboot information available. For example, if the reboot information is a reboot counter the comparison may be whether the stored reboot counter is equal to the received reboot counter. If the stored reboot counter is equal to the received reboot counter it may be determined that the given node has not rebooted since receipt of the stored reboot counter, and that the first node will update its routing information using the routing information from the given node. If at step 505 it is determined that at least one node in the comparison has routing information which is more current than the routing information of the first node, then at step 506 the first node will update the routing information using the routing information from at least one of the nodes determined to have more current routing information than the first node. If the routing information has not already been received, the first node may make a request for the routing information to be used in updating the first node.

If none of the nodes examined at step 505 are determined to have routing information more current than the first node's routing information, then at step 507 the first node may determine whether there are network overlap nodes which may be compared. The determination of whether there are network overlap nodes to examine or retrieve update information from may be based upon different types of information, which may exist or be retrieved from various locations. For example, the first node may maintain a list of network overlap nodes, which may be stored in the node's memory. The node may compare information it has on nodes to determine if any node is also able to communicate on a second (or more) network(s). Alternative embodiments may have the first node send messages to request information which either identify network overlap nodes, or allow it to determine network overlap nodes from the responses to network overlap node information requests.

If there are network overlap nodes, then the first node may return to step 502 to request information on the network overlap node, or may return to another step as appropriate, to examine the network overlap node to determine whether it has also gone through a recent reboot. In the presently preferred embodiment, the first node will not choose a network overlap node for routing information updates if the network overlap node has recently gone through a reboot. However, alternate embodiments may choose to receive reboot information from a network overlap node which has recently rebooted in the event it is unable to find another node which has not recently rebooted, including any other network overlap nodes.

In one preferred embodiment, if no network overlap nodes are found, or no network overlap nodes are found which have not recently rebooted, then the first node may proceed to step 508 where it may determine whether there are alternate power nodes. Alternate power nodes may be any node which has an alternate power source. For example, if the first node is on a first electrical power network, the reboot may have been the result of a loss of electrical power on the first electrical power network. Nodes which use an alternate power source, that is a power source different from the first electric power network, may not experience power loss when the first electrical power network experienced an outage, or power loss. Examples of alternate power sources may be a separate electrical grid, an "off grid" power source (as may occur with backup generators, alternative power sources such as wind, solar, etc.), a battery or a backup battery (a backup battery node which normally operates on power from a source such as the first electrical power source but which also has a battery to provide power in the event of loss of the primary power source or sources).

The determination of whether there are alternate power nodes to examine or request update information from may be based upon different types of information, which may exist or be retrieved from various locations. For example, the first node may maintain a list of alternate power nodes, which may be stored in the first node's memory. The first node may compare information it has on nodes to determine if any node is an alternate power node. Alternative embodiments may have the first node send messages to request information which either identify alternate power nodes, or allow it to determine alternate power nodes from the responses to alternate power node information requests. If at step 508 the first node determines there are alternate power nodes, then the first node may return to step 502 to request information on the alternate power node(s), or may return to another step as appropriate, to examine the alternate power nodes to determine whether any of them have also gone through a recent reboot. In one preferred embodiment, the first node will not choose an alternate power node for routing information updates if the alternate power node has recently gone through a reboot. However, alternate embodiments may choose to receive reboot information from an alternate power node which has recently rebooted in the event it is unable to find another node which has not recently rebooted, including any other alternate power nodes.

If no additional nodes are available to be examined, the process may end at step 509. If at step 507 or 508 the first node determines that there are additional nodes to be compared, it may return to step 502 to obtain additional information from these other nodes, and follow the process of comparison from step 502. As the first node may have compared all of the nodes that it keeps reboot information on, the first node may proceed to step 502 to request stored reboot information for other nodes as well as request routing updates. Alternatively, if at step 507 or 508 the first node determines that there are additional nodes to be examined for a recent reboot and the first node has the information needed for examination, then the first node may return to steps 504, 505, or any other step as appropriate.

The first node may, at step 505, compare the stored and received reboot information of other nodes known to the first node until it is able to find a node having routing information more current than the first node's routing information. This may include sending out other reboot information requests for reboot information of other nodes. If a node is found which has not recently rebooted, then the first node proceeds to step 506 to update its routing information.

While the process illustrated in FIG. 5 has the first node examine nodes to find either a network overlap node or an alternate power nodes, other embodiments may attempt to find either a node which is both an alternate power nodes and a network overlap node. While the process illustrated in FIG. 5 has the first node examine nodes to find a network overlap node prior to examining nodes to find an alternate power nodes, other embodiments may attempt to find alternate power nodes before attempting to find a network overlap node, or may attempt to find network overlap nodes and alternate power nodes in parallel, or may attempt to find either a network overlap node or an alternate power node, without attempting to find both an alternate power node and a network overlap node. While the process illustrated in FIG. 5 has the first node compare a node for a recent reboot after determining the node is an alternate power node or the node is a network overlap node, alternate embodiments may proceed directly to receive and/or using routing update information after determining a found node is either (or both) a network overlap node or (and) an alternate power node. While the process illustrated in FIG. 5 has the first node examine nodes to determine whether a node has recently rebooted prior to examining node(s) to find either (or both) a network overlap node or (and) an alternate power nodes, other embodiments may attempt to find either (or both) a alternate power nodes or (and) a network overlap node prior to an attempt to find nodes which are not either (or both) an alternate power node or (and) a network overlap node and which have not recently rebooted.

The above processes may be combined, in whole or in part, with our without modification, in various embodiments. For illustration purposes, multiple exemplary embodiments are provided below.

EXAMPLE 4

A wireless mesh network of 6,000 utility nodes which are coupled to utility meters. The wireless utility nodes are arranged in two subnets, referred to as UN-SUB1 and UN-SUB2. Each of UN-SUB1 and UN-SUB2 has a single access point node. A utility node in the network, designated M2381, resides in UN-SUB1. Utility node M2381 has twenty six direct access neighbors. M2381, and the other utility nodes in the network, maintain neighbor reboot information in their non-volatile memory. Specifically, utility network nodes in this embodiment use a reboot counter, which they regularly exchange with their neighbors during routine network maintenance messaging. After a reboot, M2381 requests reboot counters from other nodes, including its direct link neighbors. The neighboring nodes respond with their respective reboot counters. Utility node M2381 compares the received reboot counters with the corresponding stored reboot counters and determines that all of the responding nodes have also recently gone through a reboot. Utility node M2381 requests reboot information of additional nodes. Specifically, M2381 requests reboot information from upstream nodes. After receiving responses and comparing the received and stored reboot counters, no node is discovered which has not recently undergone a reboot. Utility node M2381 concludes the subnet UN-SUB1 as undergone a general outage. Accordingly, utility node M2381 then sends a request for route advertisement messages to one or more network overlap nodes to receive routing update information. The network overlap nodes selected to receive route advertising messages are retrieved from the memory of utility node M2381. By chance, none of the network overlap nodes retrieved from memory is among the nodes M2381 has already contacted. Based on the responses received from the queried network overlap nodes, one network overlap node M3947 is determined to not have rebooted within the time-frame in question. Accordingly, M2381 proceeds to update its routing information based on routing information obtained from M3947.

While in the above example network overlap nodes are not among the immediate nodes that were contacted earlier by M2381 after reboot, other embodiments may have one or more network overlap nodes among the nodes contacted during the request for reboot information and prior to determining the subnet had undergone a general outage.

EXAMPLE 5

A wireless mesh network of 10,000 utility nodes, with the utility nodes coupled to utility meters. The wireless utility nodes are arranged into multiple subnets, including subnets UN-SUB6 and UN-SUB7. Both UN-SUB6 and UN-SUB7 each have a single access point node. A utility node in the network, designated UM6411, resides in UN-SUB6. Utility node UM6411 has fifty three direct access neighbors. After a reboot, UM6411 requests subnet membership information from multiple nodes. The neighboring nodes respond with their subnet membership information. Utility node UM6411 analyzes the received subnet membership information to determine if any of the responding nodes are on a subnet other than the subnet that UM6411 is a member of, specifically subnet UN-SUB6. Another utility node, which responded with subnet membership information, UM7948 is a member of UN-SUB7, as well as UN-SUB6, and is therefore a network overlap node. Accordingly, utility node UM6411 then sends a request for route advertisement messages to UM7948 to receive routing update information. Accordingly, UM6411 proceeds to update its routing information based on routing information obtained from UM7948.

While in the above example node UM6411 was able to locate a network overlap node from a first request for subnet membership information, other embodiments may require multiple messages be sent to locate a network overlap node.

While in the above example node UM6411 was able to locate a network overlap node from a first request for subnet membership information sent after reboot, other embodiments may have nodes check their stored information to locate a network overlap node prior to sending a request for subnet membership information.

While in the above example node UM6411 was able to locate a network overlap node, in other embodiments a node may not be able to locate a network overlap node, and may check reboot information of other nodes to receive reboot information from nodes which have not recently rebooted, as described in other embodiments above.

While the above example embodiments updated routing information based on reboot information, other embodiments may update other information including, but not limited to, path and link costs, ambient noise levels, info-success percentages with reference to a set of upstream nodes, MAC addresses, time synchronization information, and FHSS spreading sequence codes. Routing information may include the complete path to a destination, a partial path to a destination, or a next node to which a packet is to be forwarded for reaching a destination, or any information a node may use in routing a packet to a destination. Note, the destination need not he on the same subnet or network as the sending node.

In some other embodiments, the rebooted requesting node may select a node for routing information and update and possible next hop choice based on its uptime (defined as how long the node has been in service and in operation) among other nodes which may all have the same reboot counter setting and path costs.

Figure 6A:
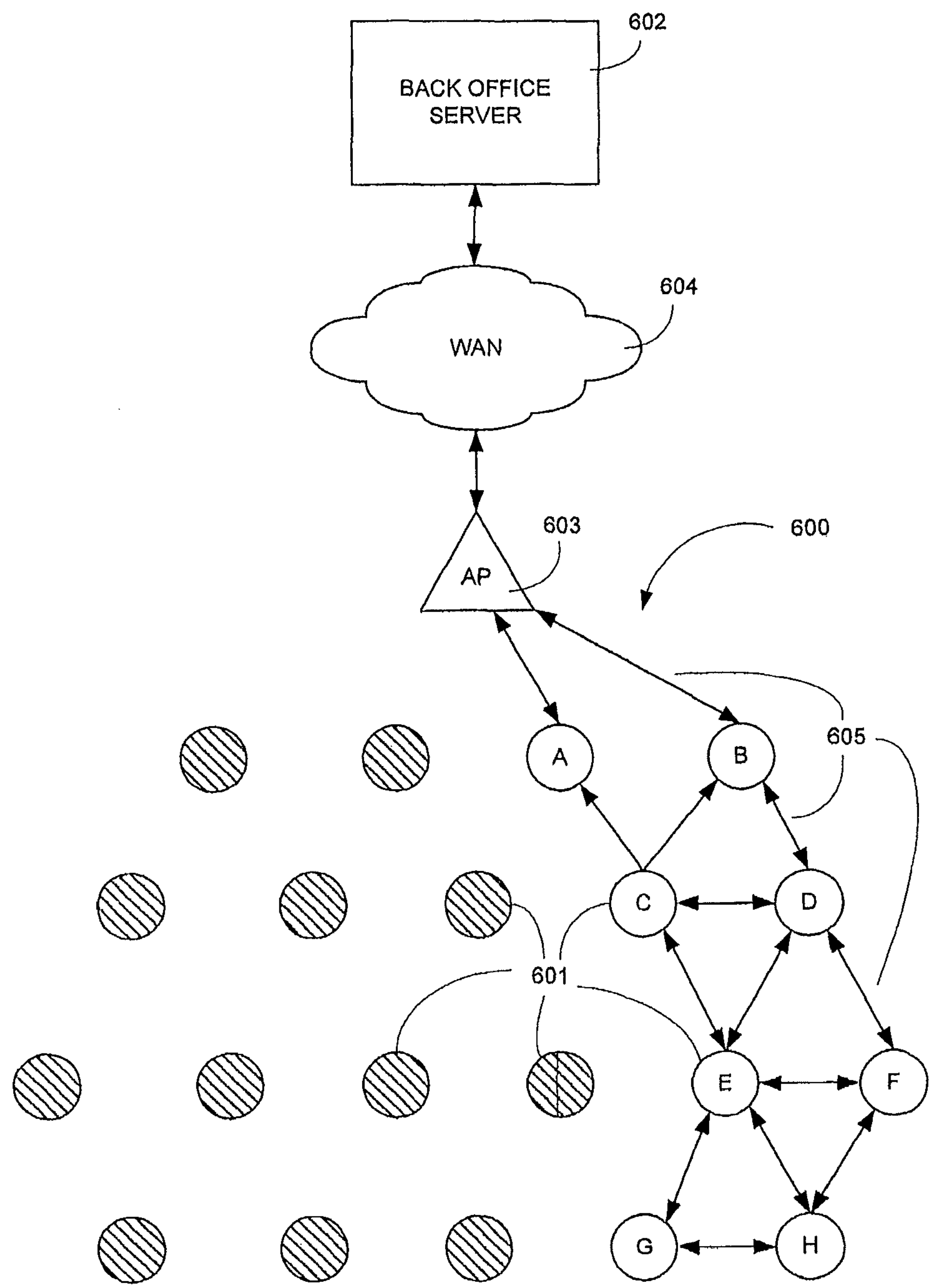
FIGS. 6A-6D illustrate a utility communications network that has experienced a power outage, and various embodiments for providing notifications of restored nodes.

As noted previously, one of the situations that may cause a node to reboot is loss of power, which may result from a service disruption, or outage, in a given area of the electricity distribution infrastructure. FIG. 6A illustrates an example of a utility communications network in which an outage has occurred. The utility network includes a wireless mesh network 600 comprised of nodes 601, each of which is coupled to a utility meter at a customer's premises. The utility nodes communicate with a back office server 602 of the utility by means of one or more access points 603, which provide egress into and out of the wireless mesh network 600 formed by the utility nodes 601. The access point 603 communicates with the back office server 602 via a suitable communication network 604, for example a wide area network. In the example of FIG. 6A, the utility nodes labeled "A" through "H" are currently active and communicate with one another via wireless links 605 within the network 600. In this example, a power outage has occurred in some part of the distribution network covered by the wireless network 600, which causes a number of other utility nodes to be without power, depicted by the shading, and therefore unable to communicate.

Figure 6B:
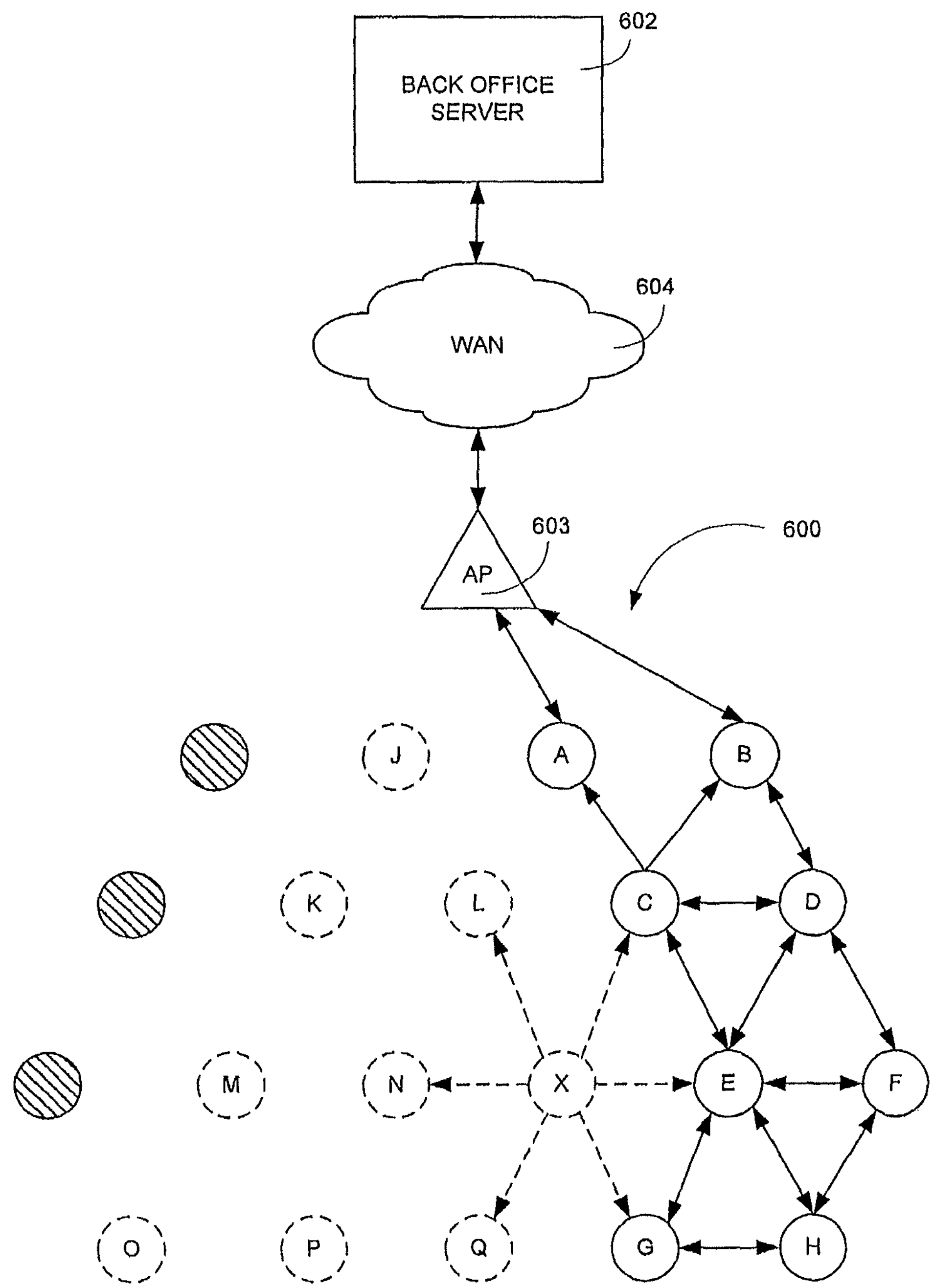

FIG. 6B depicts the situation in which power has been restored to the premises associated with some of the utility nodes that were previously without power. These newly-restored nodes are represented by dashed line circles, and labeled "J" through "Q" and "X". The nodes can quickly obtain routing information and resume normal network operations after a reboot, as described in the preceding examples. In accordance with another aspect of the invention, even before such normal operations are fully restored, the back office server 602 can be notified that power has been restored to individual nodes associated with customers' premises. Various embodiments for providing such notification to the back office server are described hereinafter.

In one embodiment, after power to a node is restored, and the node completes a reboot operation, it begins the process of discovering its neighbors, i.e., other nodes with which it can directly communicate. In the example of FIG. 6B, node X discovers that its currently active neighbors comprise nodes C, E, G, L, N and Q. When the node X establishes communication with each of its neighbors, they exchange messages that include, among other information, their age, namely the amount of the time that a node has been continuously active on the network since its last reboot, and their routing status. From this information, the node X chooses a neighbor node as its proxy, and sends a recovery message whose destination is the proxy node. In response to receipt of this message, the proxy node functions in the normal manner to route the message to the back office server, and thereby inform it that node X has recovered from the loss of power.

The selection of a proxy node can be based upon one or more criteria. For example, the selecting node might only choose those neighbors whose age is above a certain threshold and/or who advertise that they have a path to the access point 603. If multiple neighbor nodes advertise such a path, the selecting node might choose the neighbor having the lowest path cost and link cost as its proxy, where lower costs are representative of routing reliability. In the example of FIG. 6B, nodes L, N and Q only recently came online with node X, and therefore their age value might be too small. In contrast, since nodes C, E and G were not affected by the outage, they might have acceptable age values. In addition, each of nodes C, E and G can provide a path to the access point 603. Of these three nodes, node X might select node C as its proxy to send the recovery message, on the basis that it provides the shortest path to the access point, i.e, the least number of hops. It may be noted that shortest path is only one option. In other embodiments, longer paths may be acceptable for routing if they provide lower path and link costs as compared to the shortest path option.

The recovery message that the recovering node X directs to proxy node C contains relevant information about its state of recovery. That information may include the recovery node's reboot counter, the amount of time that it was without power, any momentary power outages or fluctuations that it experienced, and/or the time of power restoration. The contents of the recovery message might also include information about the neighbors of node X that it has discovered. For instance, in the example of FIG. 6B, node N has not yet found a proxy for sending a recovery message, because all of its neighbors were also affected by the outage and therefore may not meet any of the criteria for selection. The recovery message from node X may include information to indicate that it has been able to establish communication with each of nodes L, N and Q, and possibly their respective states of recovery. Consequently, the utility is informed that power has been restored to all of these nodes, even though each one of them has not yet been able to directly communicate its status to the utility. The recovery message from node X preferably includes an appropriate time stamp, so that the utility can determine how current the information is that it receives about each recovering node.

The message may also be authenticated. The recovering node may use either public key cryptography to sign the message or it may used a shared secret and symmetric key cryptography. If the sending node uses public key cryptography, then both the proxy neighbor and the back office server can determine that the message originated at the correct node. If symmetric key cryptography is used, then the authentication process may occur in two stages. The recovering node may choose a key that is shared between it and its proxy neighbor. The proxy then checks the authenticity of the message, and if it is authentic, the proxy may re-sign it with its own key and send it to the back office. Alternatively, the recovering node may sign the message using a secret that is shared with the back office. In that case, the proxy node may be unable to check the authenticity of the message.

The proxy node that receives the directed recovery message, namely node C in the example described above, can forward the message to the back office server 602 via a mechanism known as exception trapping. Within a network, certain events are identified as exceptions, about which the utility should be immediately notified. A power outage, and recovery from a power outage, are two such exceptions. Exception trapping messages are given priority within the wireless network and by the access point 603, in order to facilitate their rapid delivery to the utility back office server 602. When exception trapping is employed to send a message, the utility server is immediately notified of receipt of the message, so that it can take appropriate action.

Figure 6C:
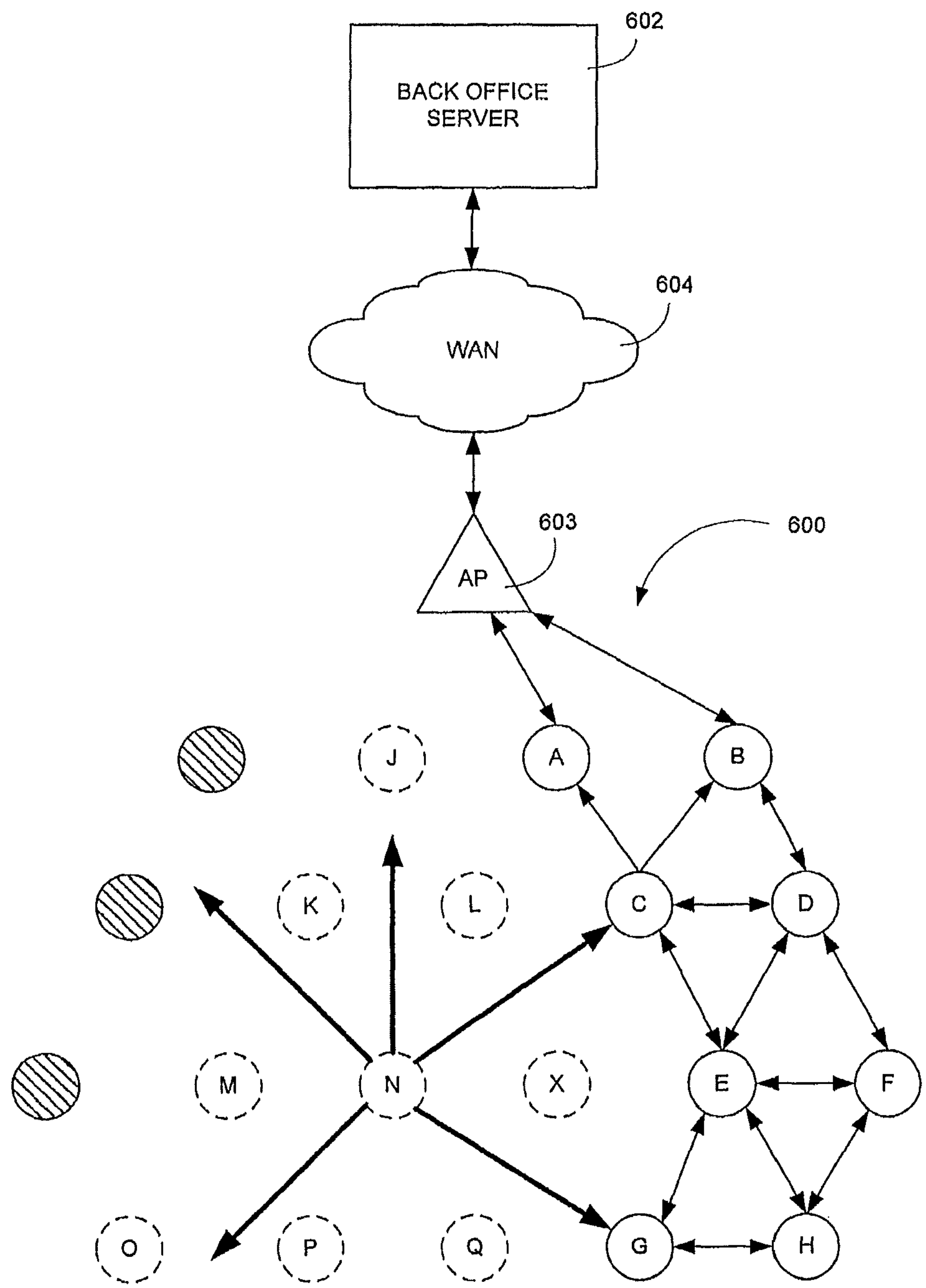

In another embodiment, a restored node need not await discovery of a neighbor to begin the notification process. An example of this embodiment is illustrated in FIG. 6C. Referring thereto, as soon as power is restored and node N has rebooted, it begins to automatically broadcast a recovery message. This broadcast can occur before, and/or during, the discovery process. If the geographic dispersement of the nodes is sufficiently dense, a currently active node may overhear the broadcasted recovery message, even if it is not one of the direct neighbors of the broadcasting node N. In the example of FIG. 6C, each of nodes C and G receives the message broadcast from node N. As soon as such a message is received, the receiving node can function as a proxy and forward the broadcasted recovery message to the back office server 602 via the access point 603, to notify the server and the access point that power has been restored to node N.

Figure 6D:
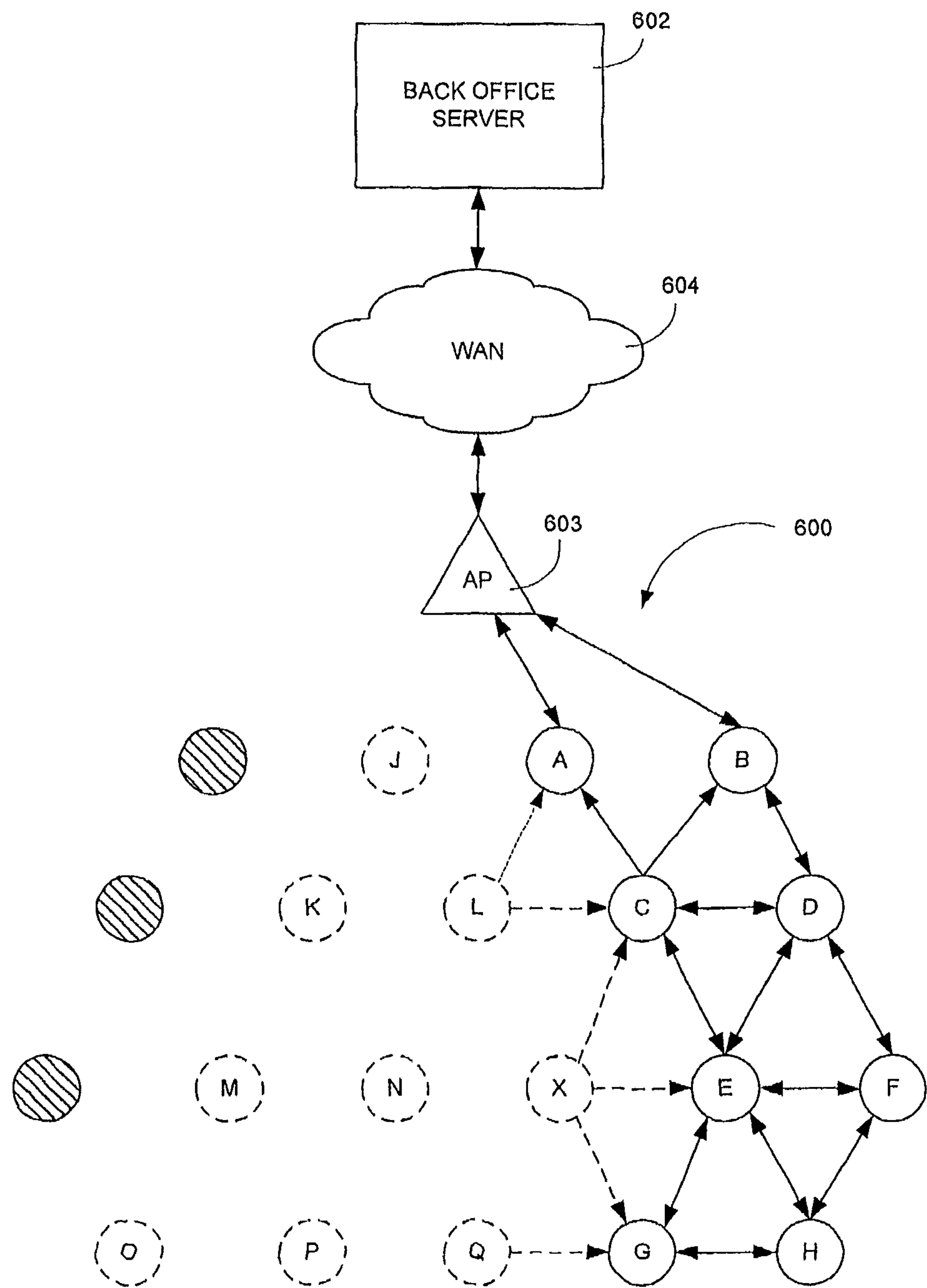

In the preceding embodiments, a recovering node takes the initiative to send a recovery message that informs the back office server of the node's restoration of power after the outage. In another embodiment, the notification of the server can be initiated by a node other than those which have just recently recovered. Referring to FIG. 6D, after power has been restored, nodes L, X and Q have discovered their active neighbors A, C, E and G who were not affected by the outage. As a result of the messages that are exchanged during the discovery process, each of nodes A, C, E and G will be able to determine that nodes L, X and Q have an age that is less than a predetermined threshold, e.g. 5 minutes. If the nodes that were not affected by the outage have been alive for a minimum period of time, e.g., 10 minutes, they can function as a self-appointed proxy, and generate a message to inform the back office server that certain nodes have been discovered which have only recently become active on the network. Thus, in this example, node A can send a message to the back office server that node L has been discovered, and report its age, node C can send a message that each of nodes L and X have been discovered, and report their respective ages, node E can also send a report on the discovery of node X and its age, and node G can send a message regarding the discovery and ages of nodes X and Q. In this embodiment, the back office server relies upon "older" nodes to recognize and inform it of the recovery of recently restored nodes.

In some implementations of this embodiment, the particular nodes that function as the self-appointedproxy nodes, to report information on recovered nodes, can be determined by dynamically resetting the age threshold for reporting nodes based on the density of the network, history of outage events in that network, and/or a performance metric set by the utility server to get the nodes back in operation as quickly as possible by using multiple redundant information gathering techniques. For example, the age threshold for reporting nodes may be reduced to allow for more nodes in the vicinity of the outage area, or who are part of the that recently recovered from outage, to report back to the server on the health and status of their neighbors. This may assist the server to ensure that the restoration is indeed in progress.

Theoretically, the recovery message can be sent to the back office server every time a node reboots. From a practical standpoint, however, there is no need to send such a message when a reboot is an event that is know a priori, for example as a result of a software upgrade, scheduled maintenance, in response to a command from the server, etc. Messages sent in these situations could result in unnecessary traffic on the network. Preferably, therefore, transmission of the recovery message is confined to those situations in which the reboot is the result of a loss of power, or other such event that causes the node to unexpectedly shut down.

To this end, the node can be provided with a mechanism that enables it to determine, upon reboot, whether the reboot was planned, or unexpected. As one example, when a node undertakes a planned reboot, it proceeds through an orderly shutdown process, to save its state and ensure that no data is lost. At the termination of this process, it can set a flag to indicate that the shutdown was deliberate and properly completed. Upon rebooting, the node can check the status of the flag, and if it is set, continue on with the normal discovery process and obtain routing information. If, however, the flag is not set, indicating that the shutdown was not expected and/or performed in an orderly manner, the recovery message can be transmitted as soon as possible.

In some embodiments, a node may have the ability to recognize when its main supply of power has been interrupted, and respond to such a situation by transmitting a "last gasp" message that it is losing power, and performing an orderly shutdown. For instance, the node may have a small backup energy source, e.g. a battery or capacitive storage, that provides sufficient power to perform such operations. In these embodiments, the node can set a flag to indicate that it is shutting down because of a power failure. When the node reboots, it can check the status of the flag and, if it is set, send the recovery message to indicate that power has been restored.

Thus, when a node unexpectedly shuts down, for example due to a loss of power, a dedicated message can be quickly sent to the back office server, to provide notification that the node is back on line. This message can be sent even before the recovering node resumes normal network operations associated with routing of messages. Instead of sending a message end-to-end from the node as the source to the back office server as the destination, the recovery message is destined for a neighboring node that functions as a proxy for the recovering node, and which takes care of the routing functions to ensure that the message is delivered to the back office server or other appropriate destination.

The embodiments presented herein combine subsystems and functionalities to illustrate the presently preferred embodiments. Alternative embodiments may include fewer or additional subsystems, processes, or functional aspects, or may be used with other subsystems, processes, or functional aspects, depending on the desired implementation. Various features and advantages of the present invention are set forth in the following claims.

The invention claimed is:

1. A method of providing notification of recovery from a power outage in a utility communications network, the method comprising:

upon rebooting of a node in the utility communications network, discovering neighbor nodes on the communications network with which the node can communicate;

selecting a discovered neighbor node as a proxy for the rebooted node;

prior to the rebooted node obtaining routing information to communicate with a utility back office server, transmitting a recovery message from the rebooted node to the selected proxy node as the destination of the message, the recovery message indicating that the rebooted node has recently come online within the network upon recovery from a loss of power, and containing parameter values relating to the state of recovery from the loss of power; and after transmitting the recovery message by the rebooted node to the selected proxy node, obtaining the routing information to communicate with the utility back office server.

2. The method of claim 1, wherein the proxy node is responsive to receipt of the message to route the message to a predetermined destination.

3. The method of claim 1, wherein the selection of a proxy node is dependent upon the age of the neighbor node.

4. The method of claim 3, wherein the rebooted node determines the age of the neighbor node by examining at least one message received from the neighbor node, the age of the neighboring node being indicative of the length of time the neighboring node has been currently active on the network.

5. The method of claim 4, wherein the rebooted node determines whether the age of the node is less than a predetermined threshold value, and if the neighboring node is determined to have an age less than the predetermined threshold value, the rebooted node automatically creates and transmits a notification message indicating that the neighboring node is active on the network and that the length of time the neighboring node has been currently active on the network is less than the predetermined threshold value.

6. The method of claim 5, wherein the notification message includes an indication of the age of the neighboring node.

7. The method of claim 6, wherein the notification message further includes a time stamp.

8. The method of claim 5, wherein the rebooted node only creates and transmits the notification message if the rebooted node's age is greater than a second threshold value.

9. The method of claim 5, wherein the predetermined threshold value is dynamically adjustable.

10. The method of claim 1, wherein the selection of a proxy node is dependent upon ability to forward a message to a predetermined destination node.

11. The method of claim 1, wherein the rebooted node selectively performs the selecting and transmitting steps in dependence upon whether the reboot is determined to have resulted from a loss of power to the node.

12. The method of claim 1, wherein the rebooted node obtains the routing information to communicate with the utility back office server from the selected proxy node.

13. The method of claim 1, wherein the parameter values include time values associated with at least one of an onset of the power outage, the resumption of power, and a length of the power outage.

14. The method of claim 1, wherein the parameter values include a reboot counter for the node.

15. The method of claim 1, wherein the recovery message further includes available information on previously stored routing parameters.

16. A method of providing notification of recovery from a power outage in a utility communications network, the method comprising:

at a first node on the network, examining messages received from neighboring nodes to determine whether the age of a neighboring node, indicative of the length of time the neighboring node has been currently active on the network, is less than a predetermined threshold value; and if the neighboring node is determined to have an age less than the predetermined threshold value, automatically creating and transmitting a message at the first node indicating that the neighboring node is currently active on the network and that the length of time the neighboring node has been currently active on the network is less than the predetermined threshold value, wherein the first node only creates and transmits the message if the first node's age is greater than a second threshold value.

17. The method of claim 16, wherein the message includes an indication of the age of the neighboring node.

18. The method of claim 16, wherein the message further includes a time stamp.

19. The method of claim 16, wherein the second threshold value is dynamically adjustable.

20. The method of claim 19, wherein dynamic adjustment of the second threshold value is based upon power outage conditions in a region.

* * * * *